United States Patent
Rowland-Hill et al.

[15] 3,669,125
[45] June 13, 1972

[54] TAILINGS RETURN DISCHARGE FOR AXIAL FLOW COMBINES

[72] Inventors: Edward William Rowland-Hill; Horace G. McCarty, both of Lancaster, Pa.

[73] Assignee: Sperry Rand Corporation, New Holland, Pa.

[22] Filed: June 23, 1971

[21] Appl. No.: 155,921

[52] U.S. Cl. .................................130/27 T, 130/27 F
[51] Int. Cl. .......................................A01f 7/06
[58] Field of Search ........................130/27 T, 27 F

[56] References Cited

UNITED STATES PATENTS

| | | | |
|---|---|---|---|
| 1,534,426 | 4/1925 | Strong et al. | 130/27 T |
| 2,433,162 | 12/1947 | Scranton et al. | 130/27 F |
| 3,482,577 | 12/1969 | De Pauw et al. | 130/27 T |

*Primary Examiner*—Antonio F. Guida
*Attorney*—John C. Thompson, et al.

[57] ABSTRACT

The tailings return discharge for an axial flow combine feeds tailings to the oppositely and adjacently downwardly rotating feed augers of the respective feed sections of two axial flow units of a combine and has a horizontal conduit, a tailings return auger within the conduit and intermediate and end ducts connecting the conduit to the axial unit feed sections, respectively, for passing tailings into the crop feed. The tailings return auger has a member over the end duct to prevent the accumulation of crop material thrown by the feed auger that is rotating at the duct exit opposite to the direction of feed of the tailings return auger.

12 Claims, 8 Drawing Figures

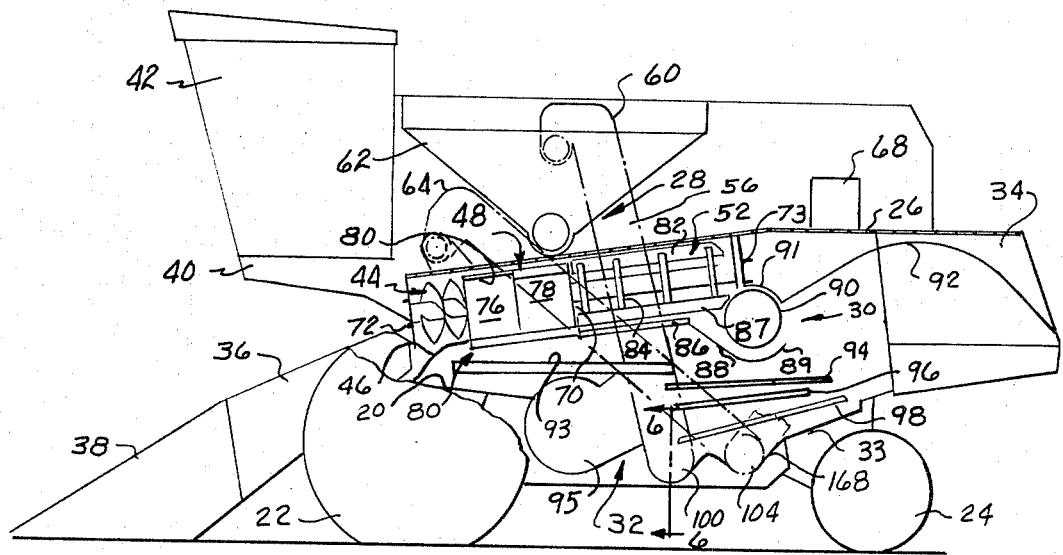

TAILINGS RETURN DISCHARGE FOR AXIAL FLOW COMBINES

BACKGROUND OF THE INVENTION

This invention relates to the return of tailings to the threshing and separating means of an axial flow combine and is directed more particularly to the prevention of the accumulation of crop material in the tailings return discharge.

In the threshing of grain bearing crop material all of the grain does not separate from the crop. In the case of wheat, barley or similar crops, some of the grain remains attached to fragments of the heads or, in the case of corn, kernels remain attached to pieces of the cob. These head fragments and cob pieces are known as tailings and are collected and returned for rethreshing. This collection and return is done by the grain handling and cleaning mechanism and the tailings return. The tailings are separated from the grain by grain handling and cleaning mechanism and returned to the crop feed of the combine by a tailings auger, tailings elevator and tailings return discharge. In the conventional combines with transverse threshing cylinders, the tailings are dropped on the incoming crop material in front of the threshing cylinder.

In the axial flow combine of the type described in the copending application, Ser. No. 790,145 filed on Jan. 9, 1969 and entitled "An Axial Flow Threshing and Separating Machine" and published in the Offenlegungsschrift 2000553 on Aug. 27, 1970, there is two axial flow threshing and separating units in side by side relation. The tailings are transferred from the grain handling and cleaning means by the tailings auger and carried up and forward by the tailings elevator to the tailings return discharge. The tailings return discharge extends transversely and horizontally over the feed sections and comprises a conduit, a chamber between the two axial flow units and a tailings return auger in the conduit which discharges into the chamber. The chamber is connected to the feed sections of the two axial flow units by openings in the upper sides thereof. The tailings pass through these openings to the main feed augers in the feed sections.

For a more even feed to the two units a preferred form is to have the conduit and tailings return auger separately connected by vertical ducts to the top of the feed sections of the axial units. The auger drops the tailings through the ducts into the feed sections. A difficulty with this form arises from the fact that the conduit and auger extend from one side of the combine across the axial units and the tailings return auger feeds in one direction. Since the feed augers of the axial units are oppositely rotating and downwardly at adjacent sides, the auger of the feed section connected to the intermediate duct rotating at the duct exit in the same direction as the direction of feed of the tailings return auger. The feed auger of the feed section connected to the end duct rotates at the duct exit opposite to the feed of the tailings return auger. This opposite direction of rotation allows the crop material to enter the end duct and to clog the end of the auger and conduit thereby stopping the flow of tailings to that feed section and disrupting the substantially even distribution of the tailings. As a result the combine has to stop and the tailings return discharge cleaned out.

OBJECTS AND SUMMARY OF THE INVENTION

An object of this invention is to maintain the tailings return discharge of an axial flow combine clear of other crop material.

Another object of this invention is to prevent the accumulation of crop material in the portion of the tailings return discharge feeding into an axial flow threshing and separating unit in which the direction of rotation of the axial flow rotor is opposite to the direction of feed of the tailings discharge.

Another object of this invention is in an axial flow combine having two side-by-side axial flow threshing and separating units with respective feed means rotating in opposite directions and downwardly at adjacent sides to provide a nonclogging tailings return discharge having a conduit connected to the respective axial units by intermediate and end ducts and an auger in said conduit feeding tailings to the intermediate duct in the direction of rotation of the respective feed means at the duct exit and to the end duct opposite to the direction of rotation of the respective feed means in which clogging accumulations do not occur.

These and other objects and advantages of this invention will be apparent from the following description and claims taken in connection with the accompanying drawings which illustrate the various features of this invention.

BRIEF DESCRIPTION OF THE DRAWINGS

FIG. 1 is a side view of an axial flow type combine with the axial flow unit, rotary discharge and cleaning means indicated in outline.

FIG. 2 is a perspective view of the tailings return discharge.

FIG. 3 is a sectional view of the tailings return discharge taken along lines 3—3 of FIG. 1.

FIG. 4 is an end view taken along lines 4—4 of the accumulation prevention means and the auger.

DETAILED DESCRIPTION OF THE PREFERRED EMBODIMENT

INTRODUCTION

Figure 5:
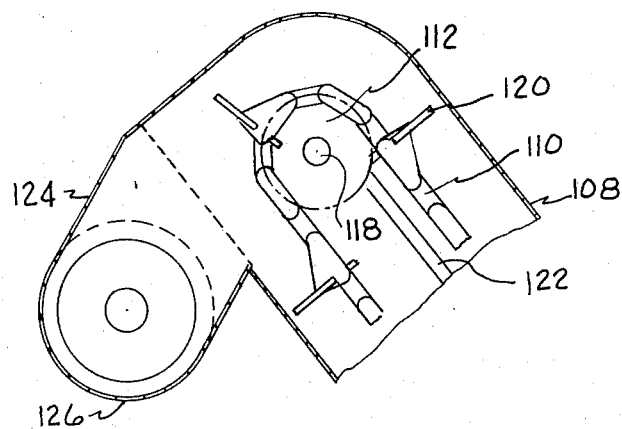
FIG. 5 is a sectional view of the connection of the tailings elevator and the tailings return discharge taken along lines 5—5 of FIG. 3.

In FIG. 1 of the drawings an axial flow combine of the type disclosed in the aforementioned Offenlegungsschrift 2000553 is shown. The combine described herein generally comprises a supporting frame 20 mounted on two large front driving wheels 22 and two small rear steering wheels 24. A housing 26 on the frame encloses the sides and rear ends of the two axial flow threshing and separating units 28, a rotary discharge assembly 30 and a grain handling and cleaning mechanism 32 extending in a housing 33 below the frame. A hood 34 is mounted on the rear to enclose the back of the housing and provide a large fore-and-aft space for discharge of chaff and threshed crop material through the open bottom.

On the front of the frame is the forwardly extending crop elevator 36 and header 38 for harvesting the crop and feeding it to the axial flow threshing and separating units 28. An operator's platform 40 projects forwardly from the frame 20 over the crop elevator 36 and has a cab 42 thereon. The operator's platform has the usual controls for operating the combine.

The axial units 28 have forward feed sections 44 receiving cut crops delivered by the ramp means 46 from the crop elevator 36. The feed sections 44 pass the crop material to the threshing sections 48 which thresh and separate the grain from the crop material. The crop material is passed to the separating sections 52 to separate the threshed grain from the remainder of the crop material and discharge it to the rotary discharge assembly 30. The upper wall of the generally cylindrically shaped casings 56 have flights 58 which spirally rotates the crop material around the casing to pass it through several threshing and separating actions.

As previously mentioned, the grain handling and cleaning mechanism 32 separates the grain from the chaff and the grain from the tailings. The chaff is discharged through the hood 34 either off the end of the grain cleaning mechanism or in an airstream. The clean grain is lifted from the grain handling and cleaning mechanism by the grain elevator 60 for temporary storage in the grain tank 62 on top of the combine. The tailings are delivered by the tailings elevator 64 to the tailings return discharge 60. The tailings return discharge drops the tailings into the two axial units 28 in substantially equal amounts.

A motor 68 is mounted on the rear of the housing 26 to provide power to drive the combine grain elevator, header, the axial units, and other components of the combine.

In this preferred embodiment the two axial threshing and separating units are described however in particular embodiments the invention could also be used with a single axial threshing and separating means.

CROP CUTTING AND FEEDING MEANS

The crop elevator 36 is pivotally mounted to the frame 20 and is raised and lowered by hydraulic jacks, not shown. The header 38 is detachably mounted on the crop elevator. For harvesting corn the header is replaced by a multiple row crop attachment. The header or attachment is wider than the wheels and combine frame. The crop elevator is about the same width as the frame. The header cuts the standing crop consolidates the crop and feeds it to the crop elevator which then feeds the crop material into the feed sections 44 along the upwardly sloped ramp 46.

AXIAL FLOW THRESHING AND SEPARATING UNITS

The rotors 70,71 of the axial flow units 28 are rotatably mounted at the ends in transverse frame beams 72,73. The feed sections 44 have feed means or augers 74,75 mounted on the rotors to deliver the crop material to the following threshing sections 48. The crop material is fed in a generally radial direction into the augers by movement along the ramp means 46 below the augers. The rotors in the threshing section are oval shape and split in two parts 76 and 78 and circumferentially displaced about 45° so that the rasp bars 80 on the two rotors initially start threshing at different times with the concaves 81 to distribute the threshing load. This feature is more fully explained in the copending patent application, Ser. No. 51,086, filed on June 30, 1970 and entitled "An Axial Flow Threshing and Separating Means with a Load Distributing Threshing Rotor." The rasp bars or threshing elements 80 cooperate with the concaves 81 to thresh the grain. The threshed crops are passed to the separator section where the blades or separating elements 82 on the oval shaped separator rotor 84 cooperate with the grate 86 to remove the entrained grain from the threshed material. The separating sections have an opening 87 in the bottoms of the casings to discharge the threshed crop material to the rotary discharge assembly 30. The assembly 30 arcs the threshed crop material out through the rear part of the hood opening.

ROTARY DISCHARGE ASSEMBLY

The rotary discharge assembly 30 is described in detail in the copending application, Ser. No. 151,682 filed on June 10, 1971 entitled "Rotary Discharge Assembly for and Axial Flow Combine" and comprises a deflector shield 88, a grate 89, a beater 90 and a curved wall 91 extending rearwardly from the cylindrically shaped plate 92 above the heater 90 defining the upper edge of the discharge opening from the beater. These parts extend across the rear of the axial units. The beater has four blades to sweep the threshed crop material across the grate 89 and discharge it rearwardly along the wall 91. The deflector shield 88 slopes downwardly and rearwardly underneath the opening 87 and extends in overlapping relation with the grate. The discharged threshed material passes downwardly through the opening 87 and is deflected to between the grate and the beater. The reorientation of the crop material and the action of the beater and the grate separates the grain from the threshed crop material and drops the grain on the grain handling and cleaning means. This reduces the grain loss in the finally discharged material. The semi-cylindrical plate 92 closes in the beater along the top to aid in the discharge. The wall 91 guides the material upwardly and then downwardly out the back part of the hood opening.

GRAIN HANDLING AND CLEANING MECHANISM

The grain handling and cleaning mechanisms 32 (FIG. 1) generally comprises a reciprocably mounted grain pan 93 extending under the threshing and separating sections and the separating sections to receive the separated grain. The grain handling and cleaning mechanism is about the width of the frame and the combined widths of the axial units. The grain is delivered to the chaffer sieve 94 for separation of the grain and chaff that is not rendered airborne by the air stream from the blower 95. The chaffer sieve is mounted to reciprocate in a fore-and-aft direction to move the heavier chaff rearwardly over the end of the chaffer sieve 94 onto the ground and separate grain which drops on the grain sieve 96. The chaffer sieve extends rearwardly beyond the end of the frame into the hood to drop the chaff thereon through the bottom opening in the hood. The fore-and-aft movement of the grain sieve moves the tailings to the rear and drops the grain onto the grain chute 98. The grain on the grain chute moves forwardly for delivery to the grain auger 100 while the tailings drop off the rear end of the grain sieve 96 to slide down the slope of the housing 33 into the tailings auger 104. Thus the grain and tailings are separated. As previously described the grain elevator 60 receives the grain from the grain auger 100 and carries it upwardly for deposit in the grain tank 62 and the tailings are carried upwardly and forwardly to the tailings return discharge 66 by the tailings elevator 64.

TAILINGS RETURN

Figure 6:
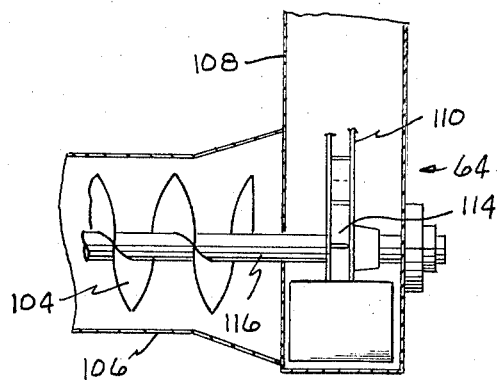
FIG. 6 is a fragmentary sectional view of the connection of the grain auger and tailings elevator taken along lines 6—6 of FIG. 1.

The tailings return has been in part previously described and generally comprises the tailings auger 104 tailings elevator 64 and tailings return discharge 66. The tailings auger 104 (FIG. 1) is located in a cylindrical portion of the housing 33 receiving the separated tailings. The cylindrical portion extends across the width of the combine and a tube 106 (FIG. 6) extends outside of the grain handling and cleaning mechanism 32 to the tailings elevator 64. The tailings auger continues through the tube to carry the tailings to the tailings elevator.

The tailings elevator 64 (FIGS. 5 and 6) of a conventional type and has a rectangular shaped casing 108 attached to the right side of the combine. The casing contains a chain conveyor or drive 110 meshing with the sprockets 112,114 at the top and bottom of the casing. The bottom sprocket 114 is mounted on the shaft 116 supporting the tailings auger 104. The top sprocket 112 is mounted on a shaft 118 rotatably supported by the casing. The chain has paddles 120 for pushing the tailings upwardly along an interior chute 122. The tailings elevator extends upwardly and higher than the tailings return discharge 66. A duct portion 124 connects the elevator and the tailings return discharge. The tailings slide down the duct 124 into the tailings return discharge.

The tailings return discharge 66 (FIGS. 2 and 3) comprises a cylindrical tubular conduit 126 which extends horizontally and transversely above the axial units 28 and substantially perpendicularly to the tailings conveyor casing. The tailings return conduit is supported by vertical braces 128,130 which are secured to the horizontal frame beams 132 and 134, respectively. The braces have arcuate supports 136,138 on the upper ends to hold the conduit 126. The arcuate support 136 is secured to a band 140 encircling the conduit 126. The conduit is firmly secured to the support by welding or the like. The conduit 126 has a square, downwardly facing intermediate opening 142 and an end opening 144. Ducts 146 and 148 are attached to the conduit by welding or the like and extend downwardly. Square shaped rubber extensions 150,152 fit around the lower end of the ducts and are secured thereto by square band clamps 154 and 156, respectively. The conduit 126 has end walls 158 and 160. The tailings return discharge auger 162 has the shaft 164 rotatably mounted in the end walls 158 and 160 and is driven by a chain and sprocket drive 166 (FIG. 3) connected to the upper shaft 118 of the tailings elevator. The tailings elevator is driven through the tailings shaft 114. A belt and pulley drive 168 on the left side of the combine is driven by motor 68 through drives, not shown. Thus power is provided to the tailings return auger through the tailings auger 104, chain drive of the tailings elevator and the chain and sprocket drive connected to the tailings return auger 162.

The tailings auger 162 (FIG. 3) of the tailings return discharge feeds the tailings from the tailings elevator in direction A and carries the tailings to the opening 142 and 144. Approximately half the tailings should drop through the opening 142 and duct 146. The other half of the tailings are carried to the end opening 144 and drop through the end or terminating duct 148 to evenly supply the tailings to the two axial units. The feed augers rotate in directions B and C. (FIG. 3). It is seen that the rotor mounted auger or augers 74,75 rotate in opposite directions and downwardly at adjacent sides. The direction B of right auger 74 is the same as the direction A of the feed of the tailings return auger 162 and the direction C of the auger 75 is opposite to the direction A of the feed of the tailings return auger. Both of the augers throw crop material up into the ducts. The direction of the crop material from the right auger is in the same direction as the movement of the tailings in the conduit and the crop material drops back down through the duct into the feed section. However with the left feed auger the crop material is projected in the opposite direction to the feed of the tailings return auger. The end of the tailings return conduit 126 and auger becomes clogged with crop material and the feed of the tailings is impeded or stopped.

In order to prevent this accumulation of crop material in the end of the discharge assembly a member 174 (FIGS. 2, 3 and 4) is positioned in the space 175 in the conduit 126 at the end of the auger 162 and above the duct 148. The member occupies part of the space and is rotatably mounted to alternately block the passage between the tailings return auger 162 and the feed auger 75 and then open the passage for the delivery of tailings. The member is semicylindrical in shape with a semicylindrical surface 176 conforming to the configuration of the conduit, end walls 178,180 and a flat wall 182. The member ends the length of the space 175 and has the flat wall 182 mounted on the shaft 164 in axial alignment therewith to rotate with the auger and sweep through the space 175 of which it occupies about half at any one time. Thus the member prevents the accumulation of the crop material in the conduit 126 and on the auger 162 and shaft 164.

Figure 7:
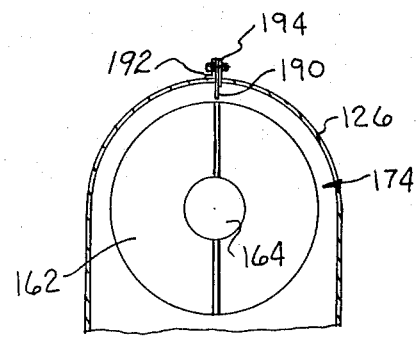
FIG. 7 is an end view of the tailings return discharge taken along lines 4—4 illustrating a modification with an anti-wrap wiper.

In FIG. 7 a scrapper 190 is mounted on the conduit 126 by fitting between the flanges 192,194. The scrapper extends inwardly to the semi-cylindrical member and along its entire length. The purpose of the scrapper is to remove any crop material that might become wrapped around the semi-cylindrical member 174. This further prevents the end of the conduit and auger from becoming clogged.

Figure 8:
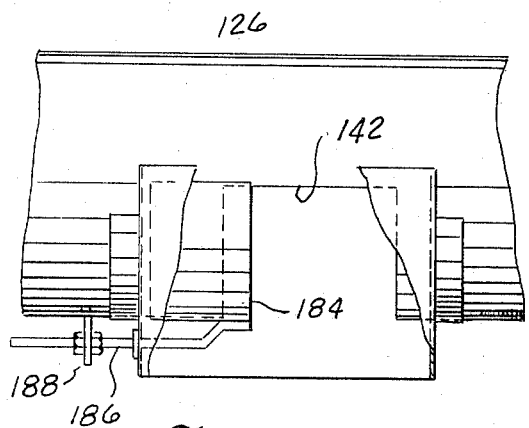
FIG. 8 is a fragmentary front view of the intermediate portion of the tailings return discharge with a slide varying the size of the intermediate opening.

Since it is very desirable to have approximately equal amounts of tailings falling into the axial flow units 28 the intermediate opening may be provided with an adjusting slide 194 as shown in FIG. 8. The amount of the opening 142 may be set by the semicircular slide 194 fitting around the conduit 126 and sliding over the opening to reduce or increase its size as may be desired. This adjustment may be made by a rod 196 attached to the slide and extending through the side wall of the duct to be fastened to a bracket 198 welded to the conduit 126 for securing the shutter in place.

SUMMARY OF FEATURES AND ADVANTAGES

From the foregoing description of the invention it is seen that the oppositely rotating feed means of the two side-by-side axial flow threshing and separating units are substantially evenly fed with tailings by the tailings return discharge. The tailings return discharge feeds across the units in one direction without the tailings return discharge becoming clogged with crop material from the feed means rotated in a direction opposite to the direction of feed of the tailings return discharge. This clogging is prevented while maintaining the delivery of the tailings to the axial units and particularly the axial unit having the feed means rotating in the opposite direction to the feed of the auger. This non-clogging feature is accomplished by the semi-cylindrical member axially mounted on the end of the auger shaft over the vertical duct to the axial unit. This semi-cylindrical member blocks the crop material and prevents wrapping and filling of the end of the auger with the crop material in axial units. The blocking of the crop material is attained while maintaining the feed of tailings. The tailings are fed by entering the space in the duct in the other side of the semi-cylindrical member and from the end of the auger when the cylindrical member is in the upper part of the conduit. A stationary wiper may be provided in the conduit to assist in the prevention of wrapping of long crop material which may be thrown into the conduit by the feed means.

This semi-cylindrical member is inexpensive to manufacture and conforms to the design and assemblage of the tailings return discharge. Thus the non-clogging of the tailings return discharge is attached by a modification readily incorporated into an existing tailings return discharge that evenly distributes the returned tailings.

While the invention has been described it will be understood that it is capable of further modifications and this application is intended to cover any variations, uses or adaptations of the invention following in general, the principles of the invention and including such departures from the present disclosure as come within known or customary practice in the art to which the invention pertains, and as may be applied to the essential features here and before set forth and as fall within the scope of the invention or the limits of the appended claims.

Having thus described our invention, what we claim is:

1. A mobile axial flow combine comprising
   an axial flow threshing and separating unit having a casing and a rotor in said casing rotatably in a given direction, said rotor having feed means in said casing for passing harvested crop material in said unit for threshing and separating grain on the harvested crop material,
   grain handling and cleaning mechanism processing the separated grain and including means for accumulating tailings separated from the grain,
   an upwardly extending tailings elevator coupled to said accumulating means,
   a tailings return discharge extending over the top of said casing and including a conduit with a discharge space and duct means connecting said conduit with said casing at said feed means and including means in said conduit for transporting tailings in a direction opposite to the direction of rotation of said feed means at the duct means exit, and
   means over said duct means in said discharge space to prevent harvested crop material from clogging said tailings return discharge.

2. A mobile axial flow combine as set forth in claim 1 wherein said clogging prevention means fills a portion of the discharge space to alternately isolate said transport means from said duct means and present said transport means for delivery of tailings to said duct means.

3. A mobile axial flow combine as set forth in claim 1 wherein said transport means is a rotatably mounted shaft with an auger thereon and said clogging prevention means is mounted on said shaft at the end of said auger and fills a portion of the discharge space in the conduit over said duct means.

4. A mobile axial flow combine as set forth in claim 3 wherein said clogging prevention member comprises a flat member on said shaft and a semi-cylindrical member mounted on said flat member and filling substantially half of said discharge space.

5. A mobile axial flow combine as set forth in claim 4 said conduit has a wiper mounted thereon and extending axially to said semi-cylindrical member about the same length as said semicylindrical member and in wiping relation therewith on rotation thereof.

6. A mobile axial flow combine comprising
a supporting frame mounted on wheels;
two axial flow threshing and separating units extending fore-and-aft and in side-by-side relation on said frame;
means on the front of said frame for feeding harvested crops to said threshing and separating units;
said axial flow threshing and separating units each having a generally cylindrical casing means and rotor means in said cylindrical casing means, each of said cylindrical casing means having a feed section, concave section and grate section, each of said rotor means having a feed section cooperating with the feed section of said respective casing means to feed harvested crop material in said respective units, threshing elements cooperating with said respective concaves, sections and separating elements cooperating with said respective grate sections, downwardly at adjacent sides for said threshing elements to thresh and separate grain in cooperation with respective concave sections and said separating elements to separate grain from said threshed crop materials in cooperation with said respective grate sections;
grain handling and cleaning mechanism underneath said axial flow threshing and separating units for receiving the separated grain and chaff therewith, and separating the grain from the chaff, said mechanism including means for separating the tailing from said grain and separately accumulating the tailings;
a conduit extending transversely over said generally cylindrical casing means and intermediate and terminating ducts connecting said conduit to said feed sections of said respective casing means;
an auger in said conduit and rotatable to feed tailings in a given direction to said ducts;
a tailings elevator connected to said tailings accumulation means of said grain handling and cleaning means and to said conduit for conveying tailings from said accumulation means to said conduit and for delivery to said auger;
said rotor means feed section receiving tailings from said terminating duct moving at said terminating duct exit in a direction opposite to the direction of feed of said auger, and
said auger having at said terminating duct a member extending axially and across said duct to prevent harvested crop material from clogging the conduit and auger at the terminating duct end.

7. A mobile axial flow combine as set forth in claim 6 wherein said member has a semi-cylindrical portion centered on the axis of said auger.

8. A mobile axial flow combine as set forth in claim 6 wherein said member has a portion aligned with the axis of said auger and semi-cylindrical portion attached to said axially aligned portion.

9. A mobile axial flow combine as set forth in claim 8 wherein said axially aligned portion is flat.

10. A mobile axial flow combine as set forth in claim 6 wherein said terminating duct and said intermediate duct pass substantially equal amounts of tailings.

11. A mobile axial flow combine as set forth in claim 6 wherein said intermediate duct has means for adjusting the amount of tailings passed by said intermediate duct.

12. A mobile axial flow combine as set forth in claim 7 wherein said conduit has a wiper extending substantially the length of said semi-cylindrical portion and in wiping relation therewith.

* * * * *